United States Patent
Lee et al.

(10) Patent No.: US 12,463,207 B2
(45) Date of Patent: Nov. 4, 2025

(54) LITHIUM METAL NEGATIVE ELECTRODE AND ELECTROCHEMICAL DEVICE COMPRISING THE SAME

(71) Applicant: LG Energy Solution, Ltd., Seoul (KR)

(72) Inventors: Do-Joong Lee, Daejeon (KR); Ki-Hyun Kim, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 18/289,981

(22) PCT Filed: Jan. 12, 2023

(86) PCT No.: PCT/KR2023/000611
§ 371 (c)(1),
(2) Date: Nov. 8, 2023

(87) PCT Pub. No.: WO2023/136642
PCT Pub. Date: Jul. 20, 2023

(65) Prior Publication Data
US 2024/0274808 A1   Aug. 15, 2024

(30) Foreign Application Priority Data
Jan. 12, 2022 (KR) .................... 10-2022-0004911

(51) Int. Cl.
*H01M 4/48* (2010.01)
*H01M 4/02* (2006.01)
(Continued)

(52) U.S. Cl.
CPC ........... *H01M 4/48* (2013.01); *H01M 4/0471* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS

| 10,374,219 B2 | 8/2019 | Kasahara et al. |
| 2010/0151321 A1 | 6/2010 | Yamamoto et al. |

(Continued)

FOREIGN PATENT DOCUMENTS

| CN | 103367703 A | 10/2013 |
| CN | 114220947 A | 3/2022 |

(Continued)

OTHER PUBLICATIONS

International Search Report for Application No. PCT/KR2023/000611 mailed Apr. 14, 2023. 4 pages.
(Continued)

*Primary Examiner* — Zhongqing Wei
(74) *Attorney, Agent, or Firm* — Lerner David LLP

(57) ABSTRACT

The present disclosure relates to a lithium metal negative electrode comprising a lithium metal layer, and an oxide layer on at least one surface of the lithium metal layer, wherein the oxide layer has a cracked region and a non-cracked region, and a method for manufacturing the same, and since the oxide layer on at least one surface of the lithium metal layer has the cracked region, it is possible to improve the battery life.

17 Claims, 8 Drawing Sheets

(51) Int. Cl.
*H01M 4/04* (2006.01)
*H01M 4/36* (2006.01)
*H01M 4/38* (2006.01)
*H01M 10/052* (2010.01)

(52) U.S. Cl.
CPC .... *H01M 10/052* (2013.01); *H01M 2004/027* (2013.01)

(56) References Cited

U.S. PATENT DOCUMENTS

| | | |
|---|---|---|
| 2014/0127557 A1 | 5/2014 | Kasahara et al. |
| 2016/0020461 A1 | 1/2016 | Yang |
| 2016/0020462 A1 | 1/2016 | Yang |
| 2020/0006754 A1 | 1/2020 | Sheng et al. |
| 2020/0067070 A1 | 2/2020 | Woo et al. |
| 2020/0099058 A1 | 3/2020 | Moon et al. |
| 2021/0050584 A1 | 2/2021 | Brewer et al. |
| 2021/0135192 A1* | 5/2021 | Gronwald ............. H01M 4/139 |

FOREIGN PATENT DOCUMENTS

| | | |
|---|---|---|
| JP | 2007157704 A | 6/2007 |
| JP | 2016029653 A | 3/2016 |
| JP | 2016511517 A | 4/2016 |
| JP | 2017135187 A | 8/2017 |
| JP | 2021157925 A | 10/2021 |
| KR | 19980074313 A | 11/1998 |
| KR | 20170101853 A | 9/2017 |
| KR | 20190006647 A | 1/2019 |
| KR | 20190076890 A | 7/2019 |
| KR | 20200054001 A | 5/2020 |
| KR | 20200112427 A | 10/2020 |
| KR | 20210026850 A | 3/2021 |
| KR | 20210070822 A | 6/2021 |
| WO | 2021030461 A1 | 2/2021 |

OTHER PUBLICATIONS

Mwemezi Manasi et al: "Dendrite-free reversible Li plating/stripping in adiponitrile-based electrolytes for high-voltage Li metal batteries", Journal of Materials Chemistry A, vol. 9, No. 8, Jan. 1, 2021 (Jan. 1, 2021), pp. 4962-4970, XP093280695.
Extended European Search Report including Written Opinion for Application No. 23740485.0 dated Jun. 10, 2025. 11 pages.

* cited by examiner

LITHIUM METAL NEGATIVE ELECTRODE AND ELECTROCHEMICAL DEVICE COMPRISING THE SAME

CROSS-REFERENCE TO RELATED APPLICATIONS

The present application is a national phase entry under 35 U.S.C. § 371 of International Application No. PCT/KR2023/000611, filed on Jan. 12, 2023, which claims priority from Korean Patent Application No. 10-2022-0004911, filed on Jan. 12, 2022, the disclosures of which are incorporated herein by reference in their entirety.

TECHNICAL FIELD

The present disclosure relates to a lithium metal negative electrode and an electrochemical device comprising the same.

BACKGROUND ART

As energy storage technology has been given increasing attention, the range of applications has been extended to energy for mobile phones, tablets, laptops and camcorders, and even to energy for electric vehicles and hybrid electric vehicles. Also, research and development of electrochemical devices are gradually increasing. In this aspect, electrochemical devices are attracting great attention, and recently, research and development have been conducted on the design of novel electrodes and batteries in order to improve the capacity density and specific energy in developing such batteries.

Among these electrochemical devices, lithium metal secondary batteries using lithium metal as a negative electrode, such as a lithium-sulfur battery (Li—S battery), have a very high theoretical capacity of 3,862 mAh/g and use light lithium metal as a negative electrode active material, so they are gaining attention as a next-generation high-capacity battery. In a lithium-sulfur battery, a reduction reaction of sulfur and an oxidation reaction of lithium metal occur during discharge, and in this instance, sulfur forms lithium polysulfide (LiPS) having a linear structure from $S_8$ with a ring structure, and the lithium-sulfur battery exhibits a step-by-step discharge voltage until the polysulfide is completely reduced to $Li_2S$.

However, in a lithium metal secondary battery such as a lithium-sulfur battery, the charge/discharge efficiency decreases during charging/discharging due to a side reaction of an electrolyte solution (deposition of by-products caused by the decomposition of the electrolyte solution) and instability of lithium metal (a short-circuit generated by the growth of dendrites on the lithium metal negative electrode), resulting in deterioration of battery life.

In particular, lithium metal, which is a negative electrode active material, easily forms a large-area dendrite and reacts with salts and additives in the electrolyte solution to form a solid electrolyte interphase (SEI), thereby continuously consuming salts and additives in the electrolyte solution. As a result, the degradation of the battery is accelerated.

Therefore, there is a need for technology development in suppressing the growth of dendrites and preventing the exhaustion of salts and additives in the electrolyte solution, in order to use lithium metal as a negative electrode.

DISCLOSURE

Technical Problem

The present disclosure is directed to providing a lithium metal negative electrode in which an oxide layer having a cracked region is formed on the surface thereof to improve lithium deintercalation, enable uniform electrodeposition and suppress dendrite growth, and an electrochemical device comprising the same.

The present disclosure is further directed to providing a method for manufacturing the lithium metal negative electrode in which an oxide layer having a cracked region is formed on the surface thereof to improve lithium deintercalation, enable uniform electrodeposition and suppress dendrite growth.

Technical Solution

To solve the above-described problem, according to an aspect of the present disclosure, there is provided a lithium metal negative electrode of the following embodiments.

According to a first embodiment, there is the lithium metal negative electrode comprising a lithium metal layer; and an oxide layer on at least one surface of the lithium metal layer, wherein the oxide layer has a cracked region and a non-cracked region.

According to a second embodiment, in the first embodiment, an area ratio of the cracked region to the non-cracked region may be 2:8 to 9:1.

According to a third embodiment, in the first or second embodiment, a thickness of the oxide layer having the cracked region may be equal to or less than 50% of a maximum thickness of the oxide layer.

According to a fourth embodiment, in any one of the first to third embodiments, a thickness of the oxide layer having the cracked region may be 10 nm to 10 μm.

According to a fifth embodiment, in any one of the first to fourth embodiments, a thickness of the lithium metal layer may be 1 μm to 200 μm.

According to a sixth embodiment, there is provided a method for manufacturing a lithium metal negative electrode according to any one of the first to fourth embodiments, comprising a lithium metal layer and an oxide layer on at least one surface of the lithium metal layer, the method comprising forming a cracked region in the oxide layer.

According to a seventh embodiment, in the sixth embodiment, forming the cracked region may comprise thermally treating the lithium metal negative electrode in a vacuum atmosphere under a pressure of 0.001 to 1 Torr.

According to an eighth embodiment, in the sixth or seventh embodiment, forming the cracked region may comprise thermally treating the lithium metal negative electrode in an inert atmosphere.

According to a ninth embodiment, in any one of the sixth to eighth embodiments, forming the cracked region may comprise thermally treating the lithium metal negative electrode at 40° C. to 120° C.

According to a tenth embodiment, in any one of the sixth to ninth embodiments, forming the cracked region may comprise thermally treating the lithium metal negative electrode at 65° C. to 85° C.

According to an eleventh embodiment, there is provided an electrochemical device comprising the lithium metal negative electrode according to any one of the first to fifth embodiments.

According to a twelfth embodiment, in the eleventh embodiment, the electrochemical device may include a lithium secondary battery.

According to a thirteenth embodiment, in the twelfth embodiment, the lithium secondary battery may include at least one of a lithium ion battery, a lithium-sulfur battery, or a lithium-lithium symmetric cell.

Advantageous Effects

In the lithium metal negative electrode according to an embodiment of the present disclosure, since the cracked region is formed in the oxide layer on the surface of the lithium metal, it is possible to improve lithium deintercalation through the cracked region, and increase the surface area of the lithium metal, thereby enabling uniform electrodeposition and suppressing dendrite growth.

In the electrochemical device comprising the lithium metal negative electrode according to an embodiment of the present disclosure, since the lithium metal negative electrode comprises the oxide layer having the cracked region on the surface thereof, it is possible to improve the life.

DESCRIPTION OF DRAWINGS

The accompanying drawings illustrate exemplary embodiments of the present disclosure and together with the foregoing disclosure, serve to provide further understanding of the technical aspect of the present disclosure, and thus, the present disclosure should not be construed as being limited to the drawings.

BEST MODE

Figure 1:
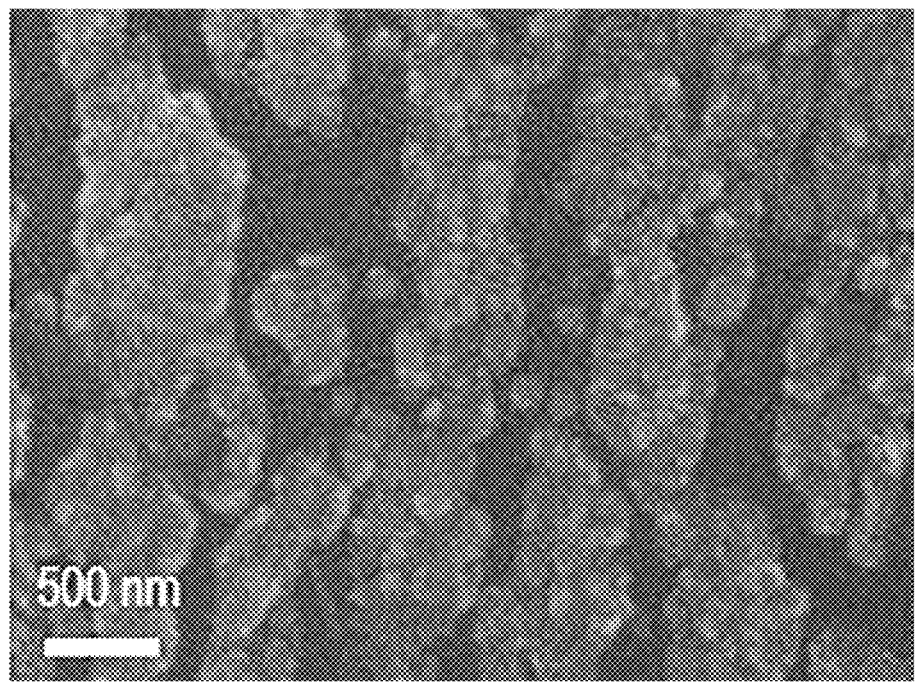
FIG. 1 is a scanning electron microscopic (SEM) image illustrating the surface of a lithium metal negative electrode manufactured in Example 1-3.

Hereinafter, exemplary embodiments of the present disclosure will be described in detail. Prior to the description, it should be understood that the terms or words used in the specification and the appended claims should not be construed as limited to general and dictionary meanings, but interpreted based on the meanings and concepts corresponding to technical aspect of the present disclosure on the basis of the principle that the inventor is allowed to define terms appropriately for the best explanation.

Therefore, the description of the embodiments is made by way of illustration and is not intended to limit the technical aspect of the present disclosure, and thus it should be understood that a variety of other equivalents and modifications could have been made thereto at the time that the patent application was filed.

When lithium metal is exposed to air, an oxide layer such as $Li_2CO_3$, $Li_2O$, LiOH, etc. is formed on the surface of the lithium metal depending on the type of gas present in air. The oxide layer makes the current density on the lithium metal surface non-uniform and reduces the surface area required for dissolution and deposition of lithium, and it acts as a resistance layer to reduce ionic conductivity. Also, the oxide layer causes non-uniform lithium deposition.

The form of the deposited lithium is related to the charge/discharge current density, the type of electrolyte, and the growth of lithium in the form of dendrite, moss, and sphere. A portion of lithium growing in the form of dendrites is stripped during discharge to form dead lithium, which is electrochemically inactive but has chemically strong reactivity. Due to the formation of dead lithium, when lithium metal is used as a negative electrode, reversible charging and discharging of lithium is impeded. As a result, even in the non-aqueous electrolyte, the electrode life characteristics of lithium metal are poor and thermal stability is low.

The inventors have found that the above-described problems can be solved by forming a cracked region in the oxide layer present on the surface of the lithium metal.

A lithium metal negative electrode according to an aspect of the present technology comprises a lithium metal layer, and an oxide layer on at least one surface of the lithium metal layer, wherein the oxide layer has a cracked region and a non-cracked region.

The lithium metal may be lithium or a lithium alloy. In this instance, the lithium alloy may comprise an alloy of lithium and an element that can be alloyed with the lithium, such as at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge and Al.

The lithium metal negative electrode may further comprise a current collector on one side of the lithium metal layer. The current collector may be a negative electrode current collector. The negative electrode current collector is not limited to a particular type and may include those having high conductivity without causing chemical change in a battery, and may be selected from the group consisting of copper, aluminum, stainless steel, zinc, titanium, silver, palladium, nickel, iron, chromium, an alloy thereof, and a combination thereof. The stainless steel may be surface-treated with carbon, nickel, titanium or silver. The alloy may comprise an aluminum-cadmium alloy, and in addition, may comprise sintered carbon, a non-conductive polymer surface-treated with a conductive material, or a conductive polymer. In general, a copper thin film may be used as the negative electrode current collector.

In addition, various forms such as a film, a sheet, a foil, a net, a porous body, a foam body, a non-woven fabric, etc. with/without fine texture on the surface thereof may be used. Also, the negative electrode current collector may have a thickness range between 3 and 500 µm. When the thickness of the negative electrode current collector satisfies the above-described range, it is possible to obtain a current collection effect and ensure processability in the process of assembling a cell by folding.

The lithium metal layer may be in the form of a sheet or a foil, and in some cases, the lithium or lithium alloy may be deposited or coated on the current collector by a dry process, or the particulate lithium or lithium alloy may be deposited or coated by a wet process.

The lithium metal may be exposed to oxygen or react with a lubricant in the process of rolling the lithium metal negative electrode to form a thick oxide layer on the surface of the lithium metal.

The lithium metal negative electrode according to an aspect of the present disclosure comprises the lithium metal layer; and the oxide layer on at least one surface of the lithium metal layer, wherein the oxide layer has the cracked region and the non-cracked region.

In the present disclosure, "the cracked region" of the oxide layer may refer to a region having a smaller thickness in the oxide layer than "the non-cracked region" of the adjacent oxide layer. For example, "the non-cracked region" may refer to a region having a large thickness in the oxide layer, and "the cracked region" may refer to a region having a smaller thickness in the oxide layer than the adjacent "non-cracked region". Specifically, "the cracked region" may refer to a region that is equal to or less than 50%, 40%, 30%, 20% or 10% of the thickness of the oxide layer of "the non-cracked region", i.e., the maximum thickness of the oxide layer of lithium metal. Alternatively, "the cracked region" may refer to an exposed region of the lithium metal layer in the absence of the oxide layer.

Figure 10:
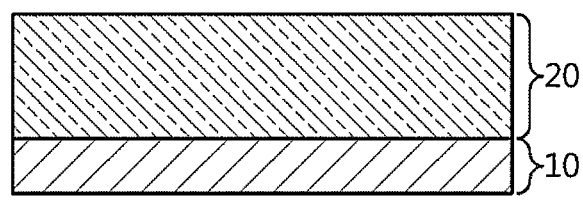
FIG. 10 is a cross-sectional view of a lithium metal negative electrode according to an embodiment of the present disclosure.
Figure 11:
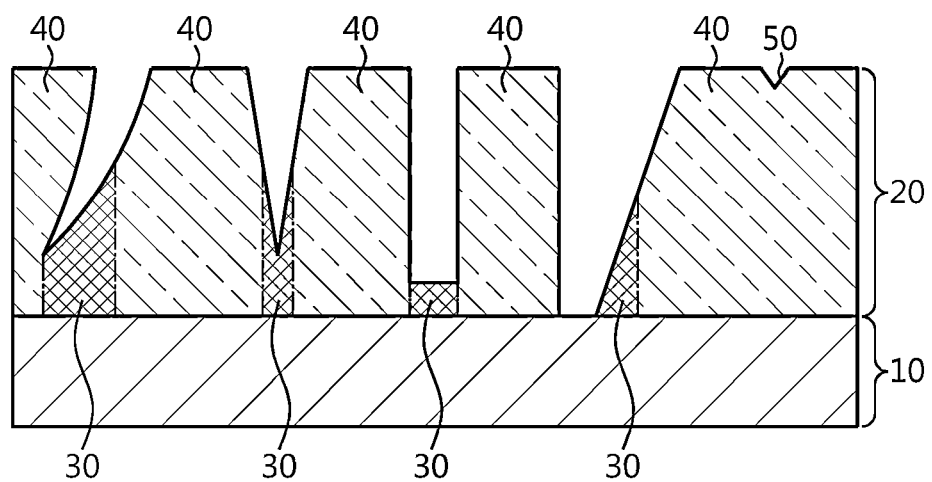
FIG. 11 is a cross-sectional view of a lithium metal negative electrode according to an embodiment of the present disclosure.

FIG. 10 is a cross-sectional view of the lithium metal negative electrode according to an embodiment of the present disclosure, and FIG. 11 is a detailed cross-sectional view of the lithium metal negative electrode according to an embodiment of the present disclosure.

Referring to FIGS. 10 and 11, the oxide layer 20 is disposed on one surface of the lithium metal layer 10, and the oxide layer 20 has the cracked region 30 and the non-cracked region 40. The cracked region 30 may be a region that is equal to or less than 50% of the maximum thickness of the oxide layer of lithium metal. Additionally, the cracked region 30 may refer to an exposed region of the lithium metal layer 10 in the absence of the oxide layer. Meanwhile, since the surface of the oxide layer cannot be completely flat, a region having a small height difference of the oxide layer surface may not be the cracked region. For example, the non-cracked region 50 is lower in height than the thickest part of the oxide layer, but is distinguished from the cracked region 30.

FIGS. 10 and 11 show the cross section of the lithium metal negative electrode according to an embodiment of the present disclosure, and the lithium metal negative electrode according to the present disclosure is not limited to the structure of FIGS. 10 and 11. Although FIGS. 10 and 11 show, for example, the oxide layer on one surface of the lithium metal layer, the oxide layer may be disposed on two surfaces of the lithium metal layer according to another embodiment of the present disclosure.

In the present disclosure, "the cracked region" may include a recess, a hole, an opening and/or a trench pit on the surface of the oxide layer. Additionally, the depth of the cracked region may refer to a height difference perpendicular to the lithium metal surface from the highest thickness of the oxide layer on the lithium metal surface to the lowest point of the cracked region. For example, in case where the highest thickness of the oxide layer on the lithium metal surface is 100 nm and the thickness of the oxide layer remaining on the cracked region is 5 nm, the depth of the cracked region may be 95 nm.

Additionally, since the surface of the oxide layer cannot be completely flat, the cracked region may not be a region having a small height difference on the oxide layer surface. That is, the cracked region may refer to only a region having a depth of at least 20 nm or more or 30 nm or more.

Additionally, the depth of the cracked region may be equal to or more than 60%, 70%, 80% or 90% of the thickness of the oxide layer. In a case where the oxide layer is completely removed from the cracked region, the depth of the cracked region may be 100% of the thickness of the oxide layer.

In the present disclosure, the "cracked region" may refer to a region free of oxide in an image observed by scanning electron microscopy (SEM) at 30,000× magnification. Alternatively, the "cracked region" may refer to a region in black or a region in darker color than the "non-cracked region" of the adjacent area in the image observed by SEM at 30,000× magnification. In contrast, the "non-cracked region" may appear white, or brighter than the cracked region of the adjacent area. In this instance, SEM imaging may be performed immediately after thermal treatment, immediately after battery formation or immediately before battery cycling, but is not limited thereto. Additionally, SEM observation is viewing the lithium metal negative electrode surface from the top, and is a vertical (top-down) observation of a plane parallel to the oxide layer and the lithium metal. The "cracked region" and "non-cracked region" may be determined as a black region or a darker region than the adjacent region and a white region or a brighter region than the adjacent region, respectively, when observing the SEM image by the naked eye.

The cracked region and the non-cracked region may be distinguished more clearly by converting the image observed by SEM to a binary image. Specifically, the cracked region and the non-cracked region may be clearly distinguished by converting the image observed by SEM into white and black.

For example, the raw image observed by SEM may be converted to the binary image through thresholding. Here, the thresholding may include global thresholding, Otsu thresholding or adaptive thresholding.

The global thresholding sets a threshold, and replaces a pixel value above the threshold into black and a pixel value below the threshold into white.

The Otsu thresholding creates a binary image using the Otsu's algorithm. The Otsu's algorithm classifies pixels of the binary image into two by an arbitrarily set threshold and finds the intensity distribution of the two classes, and this process is iteratively performed. Subsequently, among all possible cases, the threshold is selected when the intensity distribution of the two classes is the most uniform. The Otsu's algorithm automatically finds the optimal threshold.

The adaptive thresholding involves dividing an image into regions and calculating a threshold when it is converted to a binary image using only neighboring pixel values. When it is difficult to create a clear binary image by one threshold due to different background colors or various colors in the original image, the binary image of high quality may be created by adaptive thresholding.

In an embodiment of the present disclosure, an area ratio of the cracked region to the non-cracked region may be calculated using the image of the oxide layer surface observed by SEM. For example, after the cracked region and the non-cracked region are divided by the above-described method, the boundary line of the cracked region and the non-cracked region may be set, the area of the cracked region and the area of the non-cracked region may be determined, and the area ratio of the cracked region of the non-cracked region may be calculated. In this instance, the boundary line of the cracked region and the non-cracked region may be set as a boundary in which the white or bright region and the black or dark region in the SEM image are clearly distinguished. Meanwhile, due to a small height difference in the non-cracked region of the oxide layer, the non-cracked region may have a very bright part and a less bright part, and since the cracked region as used herein refers to a region that is equal to or less than a predetermined percent of the thickness of the oxide layer in the non-cracked region, even though the very bright part and the less bright part are observed in the non-cracked region, this is due to the very small height difference in the non-cracked region. Accordingly, the less bright part should be treated as the non-cracked region, and due to being less bright, it should not be treated as the cracked region.

In an embodiment of the present disclosure, the non-cracked region may form at least one 'oxide island' which is the non-cracked region surrounded by the cracked region. In this instance, the oxide island (the non-cracked region) may refer to a region having a thickness that is equal to the maximum thickness of the oxide layer, or is equal to or more than 90%, 80%, 70%, 60% or 50% of the maximum thickness of the oxide layer in the area surrounded by the cracked region. For example, the 'oxide island' may be the oxide layer region (the non-cracked region) having the thickness of 100 to 120 nm, and may be surrounded by the oxide region (the cracked region) having the thickness of 5 nm or less.

In an embodiment of the present disclosure, the 'oxide island (i.e., the non-cracked region)' region may appear in white or brighter color than the cracked region of the adjacent area in the image observed by SEM at 30,000× magnification. In contrast, the oxide deficient region (i.e., the cracked region) around the 'oxide island' may appear in black, or darker color than the non-cracked region of the adjacent area. In this instance, SEM observation may be performed immediately after thermal treatment of the lithium metal negative electrode, immediately after fabrication of the battery, or immediately before the cycling of the battery, but is not limited thereto. Additionally, SEM observation is viewing the lithium metal negative electrode surface from the top and is a vertical (top-down) observation of a plane parallel to the oxide layer and the lithium metal.

In an embodiment of the present disclosure, the oxide layer may be a lithium oxide layer. Additionally, the oxide layer may be a native oxide layer. The native oxide layer is formed on the metal surface by reaction between metal and components of air. The native oxide layer of lithium usually has a dual layer structure. In the dual layer structure, the inner layer may be lithium oxide ($Li_2O$), and the outer layer may be lithium hydroxide (LiOH) and lithium carbonate ($Li_2CO_3$). Additionally, the lithium metal may form lithium nitride ($Li_3N$) by reaction with nitrogen, and thus the native oxide layer of lithium may comprise lithium nitride. However, the constituent material of the lithium oxide layer is not limited to the above-described material and may include a variety of materials that those skilled in the art may apply.

The lithium metal negative electrode according to an embodiment of the present disclosure has the cracked region in the oxide layer on the surface of the lithium metal, and the oxide layer present on the surface of the lithium metal may be removed or broken in part. Due to the cracked region, all or part of the thick oxide layer acting as resistance to lithium deintercalation is removed or broken to expose the lithium metal or reduce the thickness of the oxide layer, thus reduce overvoltage required for lithium deintercalation, thereby improving lithium deintercalation. Also, in the electrodeposition process, the cracked region may be used as lithium nucleation sites, and due to the cracked region, the surface area of the lithium metal surface increases, and a surface electric field decreases, thereby suppressing dendrite growth, leading to uniform electrodeposition.

In an embodiment of the present disclosure, the oxide layer may have the cracked region and the non-cracked region, and the area ratio of the cracked region to the non-cracked region may be 2:8 to 9:1 or 4:6 to 6:4. When the area ratio of the cracked region to the non-cracked region satisfies the above-described range, it is easier to improve lithium deintercalation, achieve uniform electrodeposition, and suppress the growth of dendrites, thereby contributing to the improved battery life. The area of the cracked region and the area of the non-cracked region may be calculated through the image of the oxide layer observed by SEM.

In an embodiment of the present disclosure, at least part or all of the cracked region may have a thin and long shape, and an average width of the cracked region may be 1 to 500 nm, 10 to 400 nm or 50 to 300 nm.

In an embodiment of the present disclosure, at least part or all of the cracked region may have a thin and long shape, and an average length of the cracked region may be 2.5 mm or more, or 3 µm or more.

In an embodiment of the present disclosure, at least part or all of the vertical cross section of the cracked region may have a thin and long shape, and a ratio of the average length to the average width of the cracked region may be 0.001 to 0.2, 0.01 to 0.2 or 0.03 to 0.2.

The 'long shape' as used herein should be broadly understood as a shape having different diameters in different vertical directions such as a non-spherical shape, i.e., an oval shape. Additionally, the shape is not limited to the oval shape and is not limited to a rectangular shape and a wavy shape and may include an irregular shape.

The length of the cracked region is a distance between two farthest points of the cracked region, and may be determined using the image of the lithium metal having the oxide layer observed by SEM. Specifically, the length of the cracked region may be determined using the image of the electrode surface observed by SEM. Specifically, the length of the cracked region may be determined using the image of the cracked region observed on the surface.

The width of the cracked region refers to a distance between the oxide layers on one side and the other side of the cracked region in a direction perpendicular to an imaginary line connecting two farthest points of the cracked region, and may be determined using the image of the lithium metal having the oxide layer observed by SEM. Specifically, the width of the cracked region may be determined using the image of the electrode surface observed by SEM. Specifically, the width of the cracked region may be determined using the image of the cracked region observed on the surface when observing the electrode surface by SEM.

According to an embodiment of the present disclosure, the total thickness of the oxide layer may be 10 nm to 10 µm, or 20 nm to 1 µm. That is, for example, the thickness of the non-cracked region of the oxide layer may satisfy the above-described range. When the thickness of the oxide layer satisfies the above-described range, it may be easier to prevent deterioration during storage of the lithium metal and prevent the problem that lithium deintercalation does not occur due to high resistance.

According to an embodiment of the present disclosure, the lithium metal layer may be in the form of a sheet, a foil or a thin film. Additionally, the thickness of the lithium metal layer may be 1 to 200 µm, or 5 to 100 µm. When the thickness of the lithium metal layer satisfies the above-described range, it may be easier to provide a lithium source sufficient for the operation of the battery and achieve high energy density.

The lithium metal negative electrode according to an embodiment of the present disclosure may be manufactured by the following method, but is not limited thereto.

According to an aspect of the present disclosure, the method for manufacturing the lithium metal negative electrode comprising the lithium metal layer and the oxide layer on at least one surface of the lithium metal layer includes forming the cracked region in the oxide layer.

The lithium metal negative electrode according to an embodiment of the present disclosure may form the cracked region in the oxide layer formed on the surface of the lithium metal by thermal treatment of the lithium metal. The cracked region may be formed in the oxide layer present on the surface of the lithium metal by volume expansion of the lithium metal during the thermal treatment of the lithium metal.

In an embodiment of the present disclosure, the cracked region may be formed in the oxide layer formed on the surface of the lithium metal by the thermal treatment of the lithium metal at the temperature of 40° C. to 120° C., 60° C. to 100° C. or 65° C. to 85° C. When the temperature condition for the thermal treatment of the lithium metal satisfies the above-described condition, the cracked region may be sufficiently formed in the oxide layer on the surface of the lithium metal, and it is possible to prevent the thickness reduction of the lithium metal and the lithium negative electrode active material due to lithium evaporation, thereby further improving the life of an electrochemical device comprising the same.

In an embodiment of the present disclosure, the cracked region may be formed in the oxide layer formed on the surface of the lithium metal by the thermal treatment of the lithium metal in a vacuum atmosphere under the pressure of 0.001 to 1 Torr. When the lithium metal is thermally treated under the above-described pressure condition and the vacuum atmosphere, it may be easier to prevent the oxide layer from being further formed by reaction of residual gas with the surface of the lithium metal. Also, it may be easier to prevent the oxide layer from being formed again by immediate reaction of the lithium metal exposed by the cracked region with residual gas upon the formation of the cracked region during the thermal treatment.

In another embodiment of the present disclosure, the cracked region may be formed in the oxide layer formed on the surface of the lithium metal by the thermal treatment of the lithium metal in an inert atmosphere. Here, inert gas that forms the inert atmosphere refers to gas that does not cause chemical reaction, for example, argon and nitrogen, and is not limited to the above-described gas and includes any gas that those skilled in the art may apply. When the lithium metal is thermally treated in the inert atmosphere, it may be easier to prevent the oxide layer from being further formed by reaction by reaction of residual gas with the surface of the lithium metal. Also, it may be easier to prevent the oxide layer from being further formed by immediate reaction of the exposed lithium or the oxide layer reduced in thickness by the cracked region with residual gas upon the formation of the cracked region during the thermal treatment.

In an embodiment of the present disclosure, cracks may be formed in the oxide layer formed on the surface of the lithium metal by the thermal treatment of the lithium metal at 40 to 120° C. or 60° C. to 100° C. in the vacuum atmosphere at the pressure of 0.001 to 1 Torr.

In another embodiment of the present disclosure, cracks may be formed in the oxide layer formed on the surface of the lithium metal by the thermal treatment of the lithium metal at 40 to 120° C. or 60° C. to 100° C. in the inert atmosphere.

The electrochemical device according to an embodiment of the present disclosure comprises the lithium metal negative electrode having the oxide layer with cracks on its surface to improve the life.

The electrochemical device of the present disclosure includes all devices that cause electrochemical reaction, and specific examples thereof include any type of primary battery, secondary battery, fuel cell, solar cell, or capacitor such as supercapacitor device.

In an embodiment of the present disclosure, the electrochemical device may include any lithium secondary battery commonly used in the corresponding field using lithium metal as the negative electrode, and may be a lithium ion battery, a lithium-sulfur battery or a lithium-lithium symmetric cell.

The electrochemical device according to an embodiment of the present disclosure comprises a positive electrode, the lithium metal negative electrode, a separator, and a non-aqueous electrolyte solution. The electrochemical device may be manufactured through the process of placing the positive electrode and the negative electrode facing each other, interposing the separator therebetween, and injecting the non-aqueous electrolyte solution.

Hereinafter, in the electrochemical device according to an embodiment of the present disclosure, the positive electrode, the separator and the non-aqueous electrolyte solution will be described in more detail.

The positive electrode comprises a positive electrode active material, a binder and a conductive material. The positive electrode active material may include those commonly used in the electrochemical device, and for example, may include a lithium nickel cobalt manganese-based compound (lithium NCM-based compound), and may include elemental sulfur ($S_8$), a sulfur-based compound or a mixture thereof. The sulfur-based compound may be, to be specific, $Li_2S_n$ (n≥1), an organic sulfur compound, or a carbon-sulfur composite (($C_2S_x)_n$: x=2.5 to 50, n≥2). Also, the positive electrode active material may include a sulfur-carbon composite, and since sulfur has no electrical conductivity singly, it may be used in combination with a conductive material. A carbon material (or a carbon source) that constitutes the sulfur-carbon composite may include any carbon material having a porous structure or a high specific surface area commonly used in the corresponding field. The porous carbon material may include, for example, graphite; graphene; carbon black including denka black, acetylene black, ketjen black, channel black, furnace black, lamp black and thermal black; carbon nanotubes (CNTs) including single-walled carbon nanotubes (SWCNTs) and multi-walled carbon nanotubes (MWCNTs); carbon fibers including graphite nanofibers (GNFs), carbon nanofibers (CNFs), and activated carbon fibers (ACFs); activated carbon; or two or more of them, but is not limited thereto, and the shape is not limited to a particular shape and may include any shape that may be applied to the electrochemical device, for example, a spherical shape, a rod shape, a needle shape, a platy shape, a tubular shape or a bulk shape.

In addition, the carbon material has pores, and the porosity may be 40 to 90%, or 60 to 80%. When the porosity satisfies the above-described range, it may be easy to improve lithium ion transport and prevent the decrease in mechanical strength. The pore size of the carbon material may be 10 nm to 5 µm, or 50 nm to 5 µm. When the pore size of the carbon material satisfies the above-described range, it may be easy to improve lithium ion permeation and prevent battery short circuit and safety problems caused by the contact between electrodes.

The binder is a component that assists in binding the positive electrode active material to the conductive material and to the current collector, and for example, may include polyvinylidene fluoride (PVDF), polyvinylidene fluoride-polyhexafluoropropylene copolymer (PVDF/HFP), polyvinyl acetate, polyvinyl alcohol, polyvinyl ether, polyethylene, polyethylene oxide, alkylated polyethylene oxide, polypropylene, polymethyl (meth)acrylate, polyethyl (meth)acrylate, polytetrafluoroethylene (PTFE), polyvinyl chloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethyl cellulose (CMC), starch, hydroxypropyl cellulose, regenerated cellulose, or two or more of them, but is not necessarily limited thereto.

The binder may be typically added in an amount of 1 to 50 parts by weight, or 3 to 15 parts by weight, based on 100 parts by weight, i.e., the total weight of the positive electrode. When the binder content satisfies the above-described range, it may be easy to ensure the adhesion between the positive electrode active material and the current collector, and ensure the battery capacity.

The conductive material included in the positive electrode is not limited to a particular type and may include any type of conductive material having high electrical conductivity without causing side reactions in an internal environment of the electrochemical device and chemical change in the corresponding battery, and typically, may include graphite or conductive carbon, and for example, graphite including natural graphite and artificial graphite; carbon black including carbon black, acetylene black, ketjen black, denka black, thermal black, channel black, furnace black, lamp black and thermal black; a carbon-based material having a crystal structure of graphene or graphite; conductive fibers including carbon fibers and metal fibers; carbon fluoride; metal powder including aluminum powder and nickel powder; conductive whiskers including zinc oxide and potassium titanate; conductive oxide including titanium oxide; and conductive polymer including polyphenylene derivatives; or two or more of them, but is not limited thereto.

The conductive material may be typically added in an amount of 0.5 to 50 parts by weight, or 1 to 30 parts by weight, based on 100 parts by weight, i.e., the total weight of the positive electrode. When the amount of the conductive material satisfies the above-described range, it may be easy to improve electrical conductivity, prevent deterioration of electrochemical properties, and ensure the capacity and energy density of the positive electrode.

A method of including the conductive material in the positive electrode is not limited to a particular method, and common methods known in the technical field, such as coating on the positive electrode active material, may be used. Also, if necessary, instead of the conductive material, a conductive second coating layer may be added to the positive electrode active material.

Optionally, fillers may be added to the positive electrode of the present disclosure to suppress the expansion of the positive electrode. The filler is not limited to a particular type and may include any type of filler that may suppress the expansion of the electrode without causing chemical change in the battery, and for example, may include an olefin-based polymer including polyethylene and polypropylene; fibrous materials including glass fibers and carbon fibers; or the like.

The positive electrode may be manufactured by dispersing and mixing the positive electrode active material, the binder and the conductive material in a dispersion medium (solvent) to prepare a slurry, and coating the slurry on a positive electrode current collector, followed by drying and rolling. The dispersion medium may include N-methyl-2-pyrrolidone (NMP), dimethyl formamide (DMF), dimethyl sulfoxide (DMSO), ethanol, isopropanol, water and a mixture thereof, but is not necessarily limited thereto.

The positive electrode current collector may include platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), In doped $SnO_2$ (ITO), F doped $SnO_2$ (FTO), and an alloy thereof, and aluminum (Al) or stainless steel surface-treated with carbon (C), nickel (Ni), titanium (Ti) or silver (Ag), but is not necessarily limited thereto. The positive electrode current collector may be in the form of a foil, a film, a sheet, a punched one, a porous body, a foam, or the like.

The separator may be interposed between the positive electrode and the negative electrode. The separator is a physical separator having a function of physically separating the electrodes, and may include any separator commonly used in the technical field without limitation, and in particular, preferably any separator having low resistance to ion movement of the electrolyte solution and high wettability of the electrolyte solution. Also, the separator allows lithium ions to move between the positive electrode and the negative electrode while separating or insulating the positive electrode from the negative electrode. The separator may be made of a porous, non-conductive or insulating material. The separator may be an independent member such as a film, or a coating layer added to the positive electrode and/or the negative electrode.

Examples of a polyolefin-based porous membrane that may be used as the separator may include membranes made of polyethylene such as high-density polyethylene, linear low-density polyethylene, low-density polyethylene, and ultra-high molecular weight polyethylene; polypropylene; polybutylene; and polypentene, used singly or in combination. Examples of a non-woven fabric that may be used as the separator may include non-woven fabrics made of polyphenyleneoxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester, used singly or in combination. The non-woven fabric may be made with fibers that form a porous web, and may include spunbond or meltblown form of long fibers.

The thickness of the separator may be 1 to 100 µm, or 5 to 50 µm but is not limited thereto. When the thickness of the separator satisfies the above-described range, it may be easy to maintain the mechanical properties and prevent performance degradation of the battery due to the separator acting as a resistance layer. The pore size and porosity of the separator may be 0.1 to 50 µm, and 10 to 95%, respectively, but is not limited thereto. When the pore size of the separator satisfies the above-described range, it may be easy to prevent the separator from acting as a resistance layer and maintain the mechanical properties of the separator.

The non-aqueous electrolyte may comprise a first solvent comprising a heterocyclic compound with or without at least one double bond and comprising at least one of an oxygen atom or a sulfur atom; a second solvent comprising at least one of an ether-based compound, an ester-based compound, an amide-based compound or a carbonate-based compound; a lithium salt; and lithium nitrate.

Hereinafter, each of the first solvent, the second solvent, the lithium salt and the lithium nitrate included in the non-aqueous electrolyte solution according to an embodiment of the present disclosure will be described in detail.

First Solvent

The first solvent comprises a heterocyclic compound with or without at least one double bond, and comprising at least one of an oxygen atom or a sulfur atom. Since it is difficult to dissolve a salt due to delocalization of lone pair electrons of a hetero atom (an oxygen atom or a sulfur atom), a solid electrolyte interphase (SEI) layer formed on the surface of the lithium metal by a ring opening reaction of a heterocyclic compound in the initial discharge step of the battery may suppress the formation of lithium dendrites and reduce the decomposition of the electrolyte solution on the surface of the lithium metal and consequent side reactions, thereby improving the life characteristics of the electrochemical device.

That is, the heterocyclic compound of the present disclosure may comprise one or more double bonds to form a polymer protective film on the surface of the lithium metal, and definitely comprises at least one hetero atom (an oxygen atom or a sulfur atom) which is polar to increase affinity with other solvents in the electrolyte solution.

The heterocyclic compound may include 3 to 15 membered heterocyclic compounds, 3 to 7 membered heterocyclic compounds, or 5 to 6 membered heterocyclic compounds. In addition, the heterocyclic compound may include heterocyclic compounds substituted or unsubstituted with at least one selected from the group consisting of an alkyl group having 1 to 4 carbon atoms, a cyclic alkyl group having 3 to 8 carbon atoms, an aryl group having 6 to 10 carbon atoms, a halogen group, a nitro group ($—NO_2$), an amine group ($—NH_2$) and a sulfonyl group ($—SO_2$). Also, the heterocyclic compound may be a multicyclic compound of the heterocyclic compound with at least one of a cyclic alkyl group having 3 to 8 carbon atoms or an aryl group having 6 to 10 carbon atoms.

When the heterocyclic compound is substituted with an alkyl group having 1 to 4 carbon atoms, radicals are stabilized to suppress side reactions in the electrolyte solution. In addition, when the heterocyclic compound is substituted with a halogen group or a nitro group, a functional protective film may be formed on the surface of the lithium metal, and in this instance, the formed functional protective film may be stable as a compact protective film. Also, the lithium metal may be uniformly deposited. In particular, when the electrochemical device is a lithium-sulfur battery, side reactions between polysulfide and lithium metal may be suppressed.

Specific examples of the heterocyclic compound may include 1,3-dioxolane, 4,5-diethyl-1,3-dioxolane, 4,5-dimethyl-1,3-dioxolane, 4-methyl-1,3-dioxolane, 4-ethyl-1,3-dioxolane, 1,3-dioxane, 1,4-dioxane, 4-methyl-1,3-dioxane, 2-methyl-1,3-dioxane, furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-Nitrovinyl)furan, thiophene, 2-methylthiophene, 2-ethylthiphene, 2-propylthiophene, 2-butylthiophene, 2,3-dimethylthiophene, 2,4-dimethylthiophene, and 2,5-dimethylthiophene.

The first solvent comprising the heterocyclic compound may be included in an amount of 5 to 50 volume %, based on 100 volume % of the total organic solvent (i.e. first solvent+second solvent) included in the non-aqueous electrolyte solution according to an embodiment of the present disclosure (The rest corresponds to the second solvent). When the amount of the first solvent satisfies the above-described range, it may be easy to prevent the problem that the protective film is not perfectly formed on the surface of the lithium metal, and prevent the problem that the capacity and life of the battery decreases due to the increased surface resistance of the electrolyte solution and the lithium metal.

In particular, when the positive electrode active material is sulfur, it may be easy to prevent the problem that the ability to reduce the amount of dissolution of polysulfide is lowered, which makes it difficult to suppress an increase in the resistance of the electrolyte solution.

Second Solvent

The second solvent may comprise at least one of an ether-based compound, an ester-based compound, an amide-based compound and a carbonate-based compound, and may serve to not only dissolve the lithium salt so that the electrolyte solution has lithium ion conductivity, but also elute the positive electrode active material to facilitate electrochemical reaction with lithium. In particular, when the positive electrode active material is sulfur, the second solvent may serve to elute sulfur, which is the positive electrode active material, to facilitate electrochemical reaction with lithium.

The carbonate-based compound may be a linear carbonate-based compound or a cyclic carbonate-based compound.

Specific examples of the ether-based compound may include dimethyl ether, diethyl ether, dipropyl ether, methyl ethyl ether, methyl propyl ether, ethyl propyl ether, dimethoxyethane, diethoxyethane, methoxyethoxyethane, diethylene glycol dimethyl ether, diethylene glycol diethyl ether, diethylene glycol methyl ethyl ether, triethylene glycol dimethyl ether, triethylene glycol diethyl ether, triethylene glycol methyl ethyl ether, tetraethylene glycol dimethyl ether, tetraethylene glycol diethyl ether, tetra ethylene glycol methyl ethyl ether, polyethylene glycol dimethyl ether, polyethylene glycol diethyl ether, polyethylene glycol methyl ethyl ether, or two or more of them, but is not limited thereto.

In addition, the ester-based compound may include, for example, methyl acetate, ethyl acetate, propyl acetate, methyl propionate, ethyl propionate, propyl propionate, γ-butyrolactone, γ-valerolactone, γ-caprolactone, σ-valerolactone, ε-caprolactone, or two or more of them, but is not limited thereto.

The amide-based compound may be amide-based compounds commonly used in the technical field.

The linear carbonate-based compound may include, for example, dimethyl carbonate (DMC), diethyl carbonate (DEC), dipropyl carbonate (DPC), ethylmethyl carbonate (EMC), methylpropyl carbonate (MPC), ethylpropyl carbonate (EPC), or two or more of them, but is not limited thereto.

The cyclic carbonate-based compound may include, for example, ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, a halide thereof (fluoroethylene carbonate (FEC), etc.), or two or more of them, but is not limited thereto.

The second solvent may be included in an amount of 50 to 95 volume % based on 100 volume % of the total organic solvent (i.e. first solvent+second solvent) included in the non-aqueous electrolyte solution according to an embodiment of the present disclosure. When the amount of the second solvent satisfies the above-described range, the lithium salt may be sufficiently dissolved, so that it may be easy to prevent the problem that the lithium ion conductivity decreases, and it may be easy to prevent deposition of the positive electrode active material above the soluble concentration. In particular, when the positive electrode active material is sulfur, it may be easy to prevent deposition of sulfur, which is the positive electrode active material, above the soluble concentration, and it may be easy to prevent the problem that shuttle phenomenon between lithium polysulfide and lithium metal negative electrode gets worse due to excessive elution of sulfur and the lifespan is shortened.

Meanwhile, the organic solvent comprising the first solvent and the second solvent may be included in an amount of 60 to 99.5 wt %, 60 to 99 wt %, 60 to 98 wt %, or 60 to 95 wt %, based on 100 wt % of the total non-aqueous electrolyte solution according to an embodiment of the present disclosure. When the amount of the organic solvent satisfies the above-described range, it may be easy to prevent the problem that the viscosity of the electrolyte solution increases and the ionic conductivity decreases, or the problem that the lithium salt or additive is not completely dissolved in the electrolyte solution, and it may be easy to prevent the problem that the ionic conductivity decreased due to the low lithium salt concentration in the electrolyte solution.

Lithium Salt

The lithium salt is an electrolyte salt used to increase ionic conductivity, and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiCABO$_8$, LiAsF$_6$, LiSbF$_6$, LiAlCl$_4$, CH$_3$SO$_3$Li, CF$_3$SO$_3$Li, (C$_2$F$_5$SO$_2$)$_2$NLi, (SO$_2$F)$_2$NLi (i.e. LiFSI), (CF$_3$SO$_2$)$_2$NLi (i.e. LiTFSI), (CF$_3$SO$_2$)$_3$CLi, lithium chloroborane, lower aliphatic lithium carboxylate having 4 or less carbon atoms, lithium tetraphenylborate, lithium imide, or two or more of them.

The concentration of the lithium salt may be determined, taking ionic conductivity into account, and may be, for example, 0.2 to 2 M, or 0.5 to 1 M. When the concentration of the lithium salt satisfies the above-described range, it may be easy to ensure ionic conductivity suitable for operating the battery, and it is possible to prevent the decreased mobility of lithium ions due to the increased viscosity of the electrolyte solution, or prevent an increase in the decomposition reaction of the lithium salt itself.

Lithium Nitrate

The non-aqueous electrolyte solution according to an embodiment of the present disclosure may comprise lithium nitrate (LiNO$_3$). The lithium nitrate reacts with the lithium metal negative electrode to form a lithiophilic protective film such as lithium nitride (Li$_3$N) and lithium oxynitride (LiON) on the surface of the lithium metal negative electrode, thereby suppressing lithium dendrite growth and preventing decomposition of the components of the electrolyte solution, resulting in improved battery life and efficiency.

In addition, if necessary, lanthanum nitrate (La(NO$_3$)$_3$), potassium nitrate (KNO$_3$), cesium nitrate (CsNO$_3$), magnesium nitrate (MgNO$_3$), barium nitrate (BaNO$_3$), lithium nitrite (LiNO$_2$), potassium nitrite (KNO$_2$), cesium nitrite (CsNO$_2$), or two or more of them may be further included.

The lithium nitrate may be included in an amount of 0.1 to 7 wt %, 0.5 to 5 wt %, or 0.5 to 1.5 wt %, based on 100 wt % of the total non-aqueous electrolyte solution. When the amount of the lithium nitrate satisfies the above-described range, it may be easy to prevent a sharp decrease in Coulombic efficiency, and it may be easy to prevent an increase in the viscosity of the electrolyte solution.

The non-aqueous electrolyte solution according to an embodiment of the present disclosure may comprise 1,3-dioxolane as the first solvent, dimethoxyethane as the second solvent, (CF$_3$SO$_2$)$_2$NLi as the lithium salt, and the lithium nitrate. The 1,3-dioxolane and dimethoxyethane may having high lithium polysulfide solubility and stabilize the lithium metal negative electrode. Accordingly, when the non-aqueous electrolyte solution comprises the above-described materials, the optimal characteristics of the electrochemical device may be exhibited.

Meanwhile, a lithium secondary battery according to an embodiment of the present disclosure may be applied to a battery cell used as a power source for a small device, and may be particularly suitably used as a unit cell for a battery module which is a power source for a medium- or large-scale device. In this aspect, the present disclosure also provides a battery module comprising two or more electrochemical devices electrically connected to each other (in series or parallel). It is obvious that the number of electrochemical devices included in the battery module may be variously adjusted in view of the use and capacity of the battery module. Further, the present disclosure provides a battery pack comprising battery modules electrically connected to each other by the commonly used method. The battery module and the battery pack may be used as a power source for at least one medium-to-large device of a power tool; an electric vehicle including an electric vehicle (EV), a hybrid electric vehicle (HEV), and a plug-in hybrid electric vehicle (PHEV); an electric truck; an electric commercial vehicle; or an energy storage system, but the present disclosure is not necessarily limited thereto.

Hereinafter, the embodiments of the present disclosure will be described in detail to help understanding of the present disclosure. The embodiments according to the present disclosure may, however, be embodied in many different forms and the scope of the present disclosure should not be interpreted as being limited to the following embodiments. The embodiments of the present disclosure are provided to thoroughly explain the present disclosure to those skilled in the art.

Example 1-1

A 35 μm thick lithium metal was thermally treated at the temperature of 40° C. using a convection oven in a vacuum atmosphere under the pressure of 0.01 Torr for 4 hours, and then rolled on one surface of a copper current collector to obtain a lithium metal negative electrode.

Example 1-2

A lithium metal negative electrode was manufactured in the same manner as Example 1-1, except thermal treatment was conducted at the temperature of 60° C.

Example 1-3

A lithium metal negative electrode was manufactured in the same manner as Example 1-1, except thermal treatment was conducted at the temperature of 80° C.

Example 1-4

A lithium metal negative electrode was manufactured in the same manner as Example 1-1, except thermal treatment was conducted at the temperature of 100° C.

Example 1-5

A lithium metal negative electrode was manufactured in the same manner as Example 1-1, except thermal treatment was conducted at the temperature of 120° C.

Comparative Example 1-1

A 35 µm thick lithium metal was used as a lithium metal negative electrode without any treatment.

Examples 2-1 to 2-5 and Comparative Example 2-1: Manufacture of Lithium-Lithium Symmetric Cell First, lithium nitrate was added to an organic solvent in an amount of 1 wt % based on the total weight of the electrolyte solution, the organic solvent comprising 1,3-dioxolane (first solvent) and dimethoxyethane (second solvent) at a volume ratio (v/v) of 1:1, and dissolved such that the concentration of $(CF_3SO_2)_2NLi$ (LiTFSI) (lithium salt) is 1 M to prepare a non-aqueous electrolyte solution.

The lithium metal negative electrodes manufactured in Examples 1-1 to 1-5 and Comparative Example 1-1 were equally used as a positive electrode and a negative electrode, and in this instance, lithium was positioned to face each other. Subsequently, a 16 µm thick porous polyethylene (PE) separator was interposed between the positive electrode and the negative electrode, and the prepared non-aqueous electrolyte was respectively injected and sealed to manufacture a coin cell type lithium-lithium symmetric cell.

Examples 3-1 to 3-5 and Comparative Example 3-1: Manufacture of Lithium-Sulfur Battery First, 87.5 parts by weight of a sulfur-carbon (CNT) composite (S/C 75:25 weight ratio) as a positive electrode active material, 5 parts by weight of denka black as a conductive material, and 7.5 parts by weight of styrene butadiene rubber/carboxymethyl cellulose (SBR/CMC 7:3) as a binder were mixed to prepare a positive electrode slurry composition, and the positive electrode slurry composition was applied to one surface of a current collector (Al Foil), followed by dried at 80° C. and pressed using a roll press to manufacture a positive electrode (in this instance, the loading amount was 4.5 mg/cm$^2$).

Subsequently, the manufactured positive electrode and the lithium metal negative electrodes manufactured in Examples 1-1 to 1-5 and Comparative Example 1-1 were placed facing each other, a porous polyethylene (PE) separator was interposed therebetween, and the non-aqueous electrolytes prepared in Examples 2-1 to 2-5 and Comparative Example 2-1 were respectively injected and sealed to manufacture a coin cell type lithium-sulfur battery.

Figure 2:
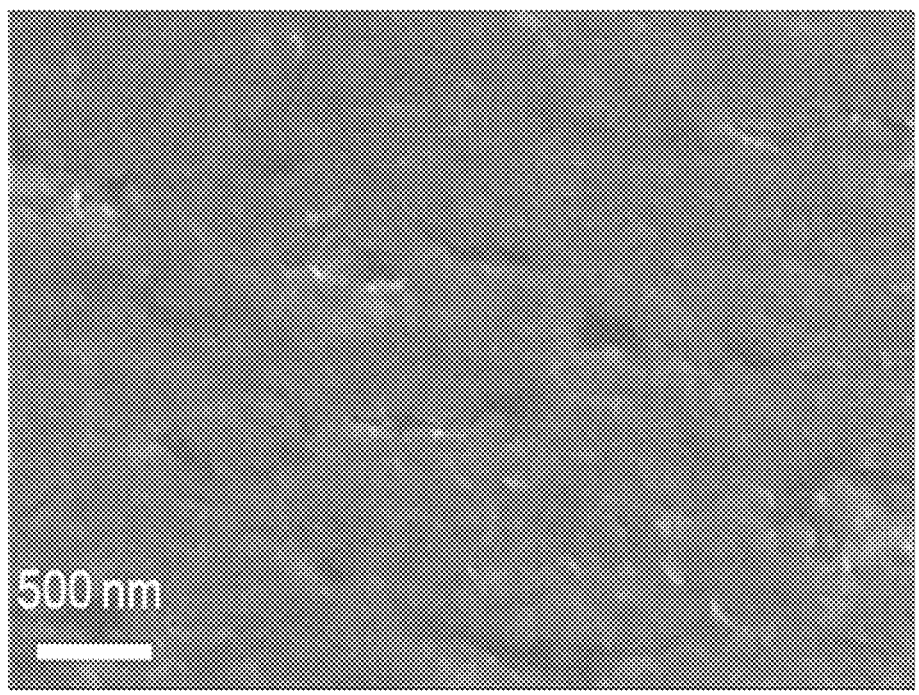
FIG. 2 is a SEM image illustrating the surface of a lithium metal negative electrode manufactured in Comparative Example 1-1.
Figure 3:
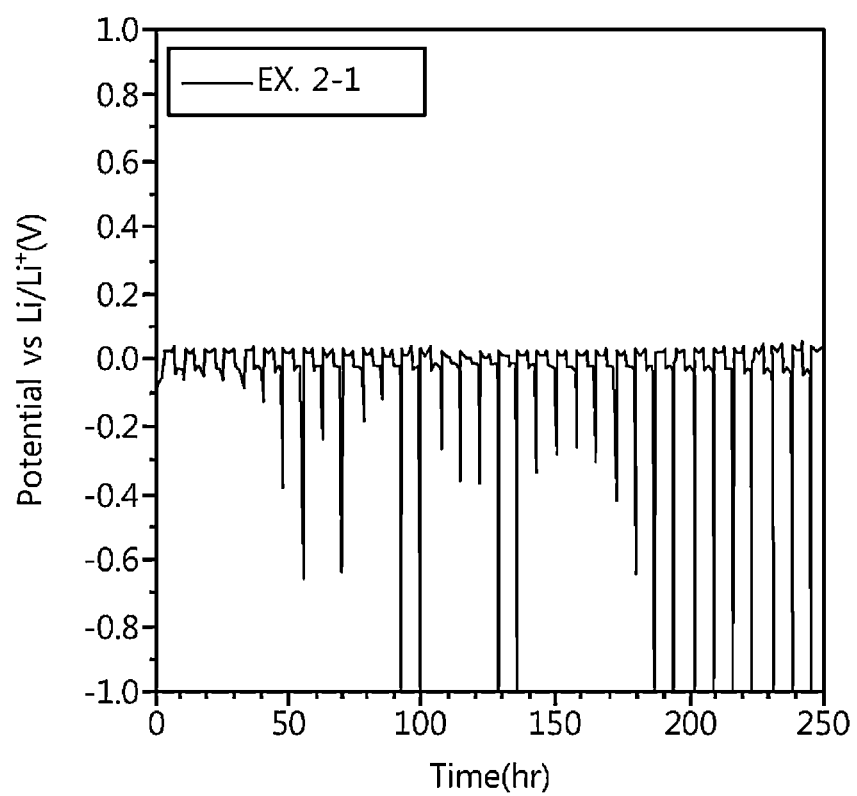
FIG. 3 is a diagram illustrating the cycle life performance of a lithium-lithium symmetric cell according to Example 2-1.
Figure 4:
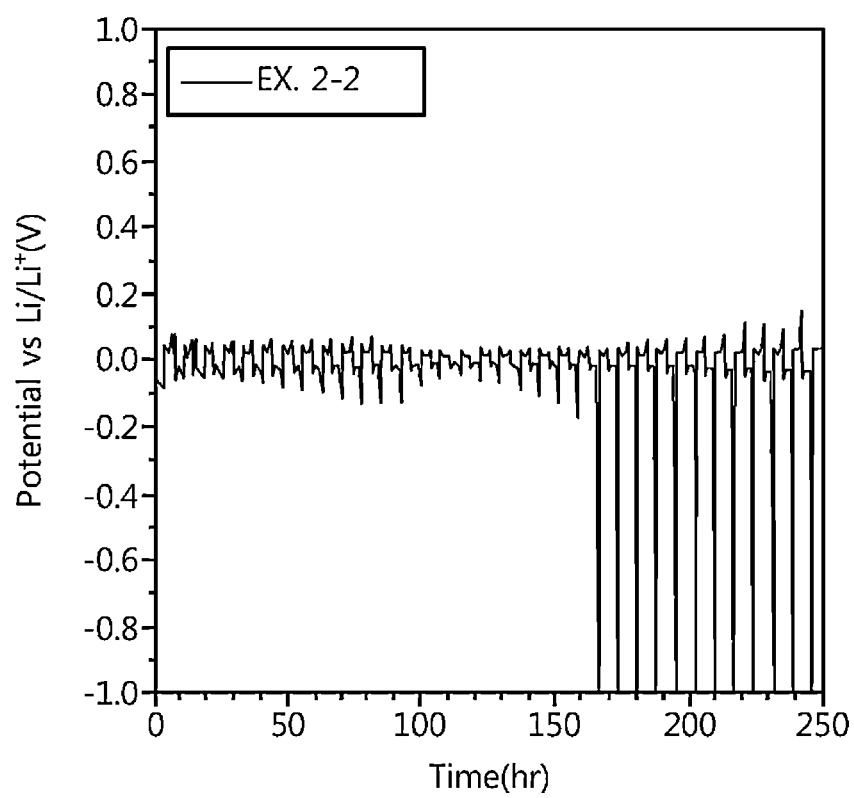
FIG. 4 is a diagram illustrating the cycle life performance of a lithium-lithium symmetric cell manufactured in Example 2-2.
Figure 5:
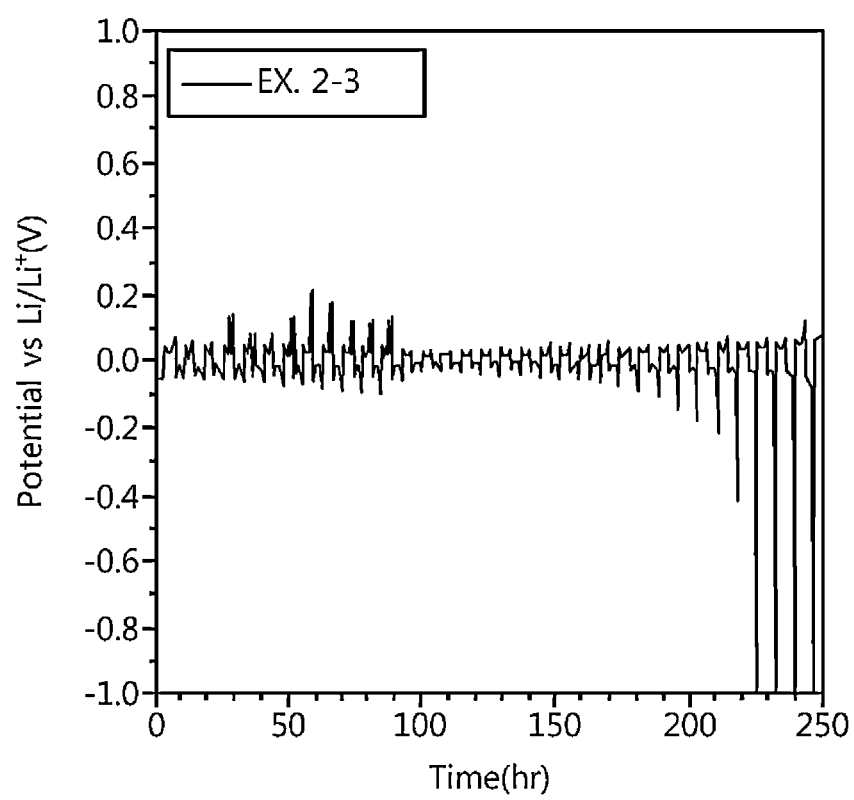
FIG. 5 is a diagram illustrating the cycle life performance of a lithium-lithium symmetric cell manufactured in Example 2-3.
Figure 6:
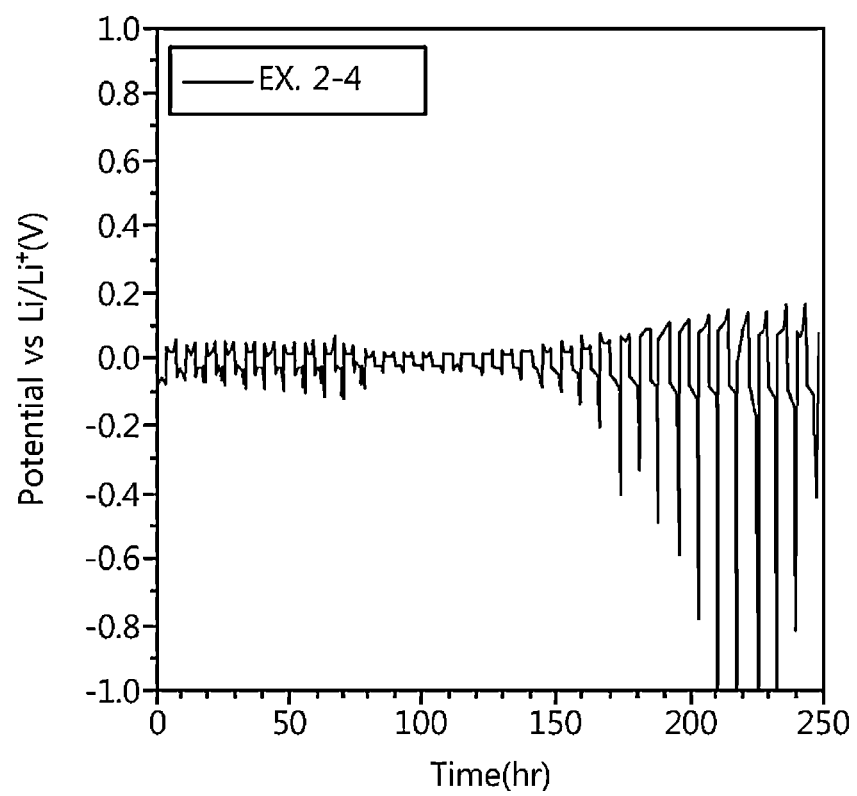
FIG. 6 is a diagram illustrating the cycle life performance of a lithium-lithium symmetric cell manufactured in Example 2-4.
Figure 7:
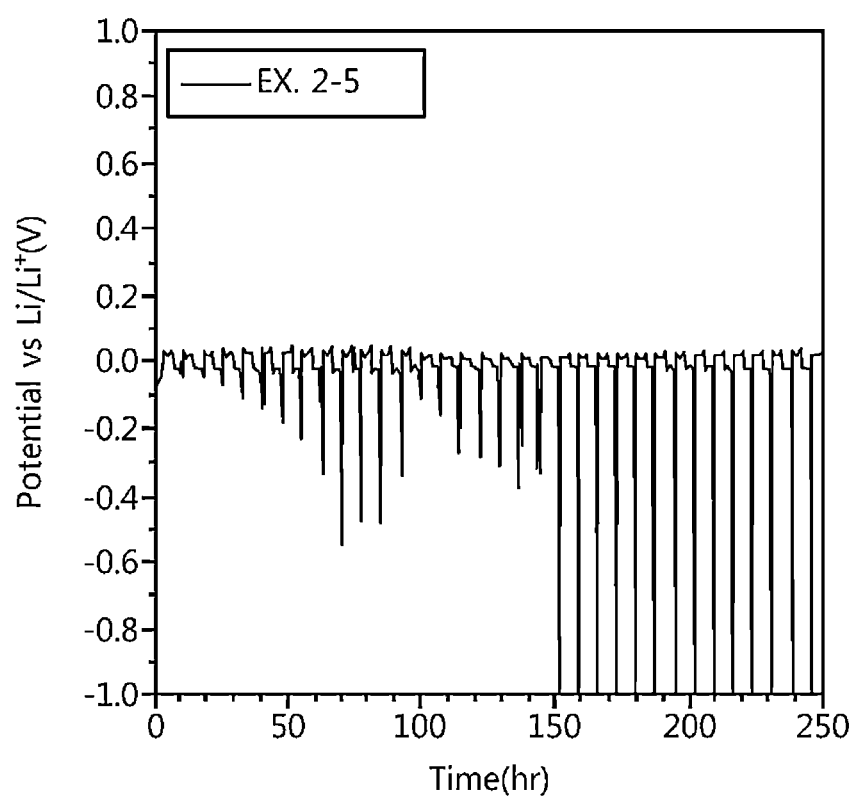
FIG. 7 is a diagram illustrating the cycle life performance of a lithium-lithium symmetric cell manufactured in Example 2-5.
Figure 8:
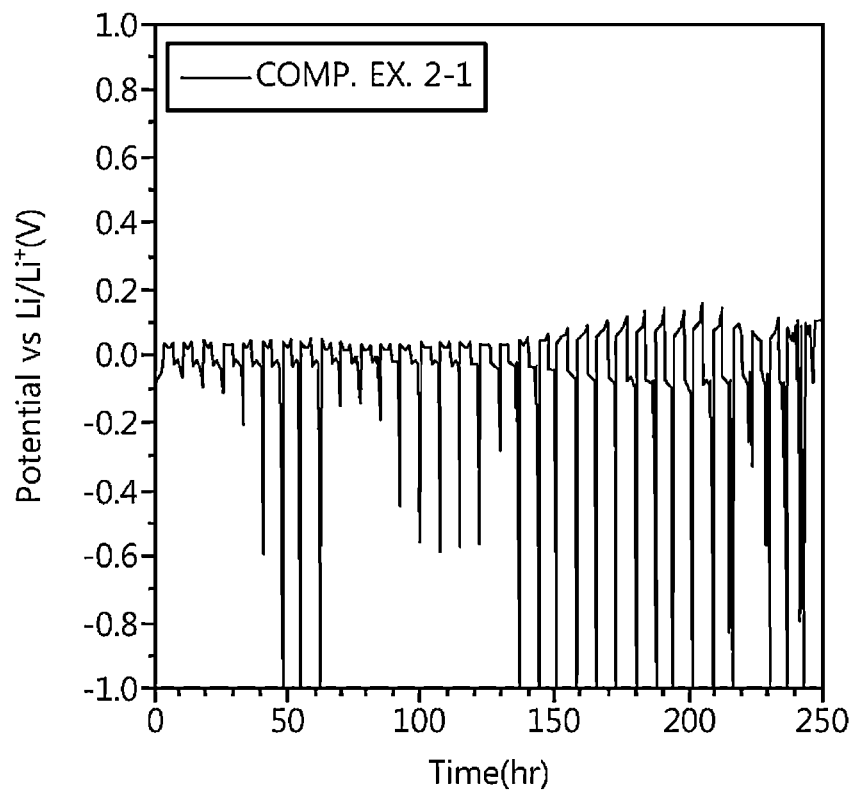
FIG. 8 is a diagram illustrating the cycle life performance of a lithium-lithium symmetric cell manufactured in Comparative Example 2-1.

Evaluation Example 1: Surface Observation of Lithium Metal Negative Electrode The surfaces of the lithium metal negative electrode manufactured in Example 1-3 and the lithium metal negative electrode manufactured in Comparative Example 1-1 were observed by scanning electron microscopy (SEM), and are shown in FIGS. 1 and 2, respectively. In this instance, SEM observation of the lithium metal negative electrode manufactured in Example 1-3 was performed immediately after the thermal treatment. The used SEM equipment is JEOL JSM-7200F, the magnification is 30,000×, and the acceleration voltage is 5 kv. Additionally, the resolution performance of the used equipment is 1 nm at 20 kv, 1.6 nm at 1 kv and thus 1 to 1.6 nm at 5 kv.

As can be seen from FIG. 2, in the lithium metal negative electrode manufactured in Comparative Example 1-1, it can be seen that the lithium metal surface is covered with a native oxide layer without a cracked region.

In contrast, as can be seen from FIG. 1, in the lithium metal negative electrode manufactured in Example 1-3, it can be seen that the cracked region is formed in the oxide layer present on the surface of the lithium metal.

Evaluation Example 2: Calculation of Area Ratio of Cracked Region to Non-Cracked Region of Lithium Metal Negative Electrode The area ratio of the cracked region to the non-cracked region was calculated using images of the surfaces of the lithium metal negative electrodes manufactured in Examples 1-1 to 1-5 and Comparative Example 1-1, observed by SEM. Here, the used SEM equipment was JEOL JSM-7200F, the magnification is 30,000×, and the acceleration voltage was 5 kv. Additionally, the resolution performance of the used equipment was 1 nm at 20 kv, and 1.6 nm at 1 kv and thus 1 to 1.6 nm at 5 kv.

Specifically, in the image observed by SEM, the non-cracked region appeared brighter due to its rough and uneven surface, and the cracked region appeared dark due to its smooth surface. To make use of this property, the SEM image was converted to a binary image using "ImageJ" software, the colors of the binary image were inverted such that white becomes black and vice versa to maximize the light intensity so that the non-cracked region looked dark and the cracked region looked bright. Subsequently, the area ratio was calculated using the area of the cracked region and the area of the non-cracked region, and the results are shown in the following Table 1.

TABLE 1

|  | Thermal treatment temperature (° C.) | Area ratio of cracked region to non-cracked region |
|---|---|---|
| Example 1-1 | 40 | 2:8 |
| Example 1-2 | 60 | 4:6 |
| Example 1-3 | 80 | 5:5 |
| Example 1-4 | 100 | 6:4 |
| Example 1-5 | 120 | 9:1 |
| Comparative Example 1-1 | — | — |

Evaluation Example 3: Cycle Life Evaluation of Lithium-Lithium Symmetric Cell In the lithium-lithium symmetric cells manufactured in Examples 2-1 to 2-5 and Comparative Example 2-1, the potential was measured over time (cycles) by repeating the discharge (−1 V lower limit) and charge (+1 V upper limit) cycles at the temperature of 25° C. with the current density of 1.5 mA/cm², and the cycle life was evaluated and shown in Table 2 and FIGS. 3 to 8 below. When the lithium negative electrode smoothly works during the operation of the symmetric cell, the overvoltage level is at 0.1V, but when the lithium negative electrode degrades, a larger overvoltage is needed to deintercalate lithium. When the overvoltage of −1V is needed, it may indicate poor lithium deintercalation at the lithium negative electrode, and thus it may signify that the lithium negative electrode fails to normally work. Table 2 summarizes the cell life when the overvoltage needed to deintercalate lithium is −1V.

TABLE 2

| | Thermal treatment temperature (° C.) | Cycles (based on reaching at −1 V) |
|---|---|---|
| Example 2-1 | 40 | 13 |
| Example 2-2 | 60 | 23 |
| Example 2-3 | 80 | 31 |
| Example 2-4 | 100 | 29 |
| Example 2-5 | 120 | 21 |
| Comparative Example 2-1 | — | 9 |

As can be seen from Tables 1 and 2 and FIGS. 3 to 8, it can be seen that the lithium-lithium symmetric cells manufactured in Examples 2-1 to 2-5 show improved cycle life due to uniform electrodeposition induced by the cracked region formed in the oxide layer on the surface of the lithium metal, compared to the lithium-lithium symmetric cell manufactured in Comparative Example 2-1 without the cracked region in the oxide layer on the surface of the lithium metal. In particular, it can be seen that the battery life was further improved in the lithium-lithium symmetric cells manufactured in Examples 2-2 to 2-4 in which the thermal treatment temperature was 60 to 100° C.

Evaluation Example 3: Cycle Life Evaluation of Lithium-Sulfur Battery

In the lithium-sulfur batteries manufactured in Examples 3-1 to 3-5 and Comparative Example 3-1, 0.2 C charge/0.3 C discharge cycles in CC mode at the temperature of 25° C. were performed in the voltage range between 1.8 and 2.5 V to measure the capacity-potential according to the charge/discharge cycle (initial 0.1 C/0.1 C 2.5 cycles, stabilization at 0.2 C/0.2 C 3 cycles, and operation at 0.3 C/0.5 C from the 7th cycle), and the results are shown in Table 2 and FIG. 9 below.

TABLE 3

| | Thermal treatment temperature (° C.) | Cycles (based on 80% discharge capacity) |
|---|---|---|
| Example 3-1 | 40 | 107 |
| Example 3-2 | 60 | 158 |
| Example 3-3 | 80 | 186 |
| Example 3-4 | 100 | 172 |
| Example 3-5 | 120 | 118 |
| Comparative Example 3-1 | — | 83 |

Figure 9:
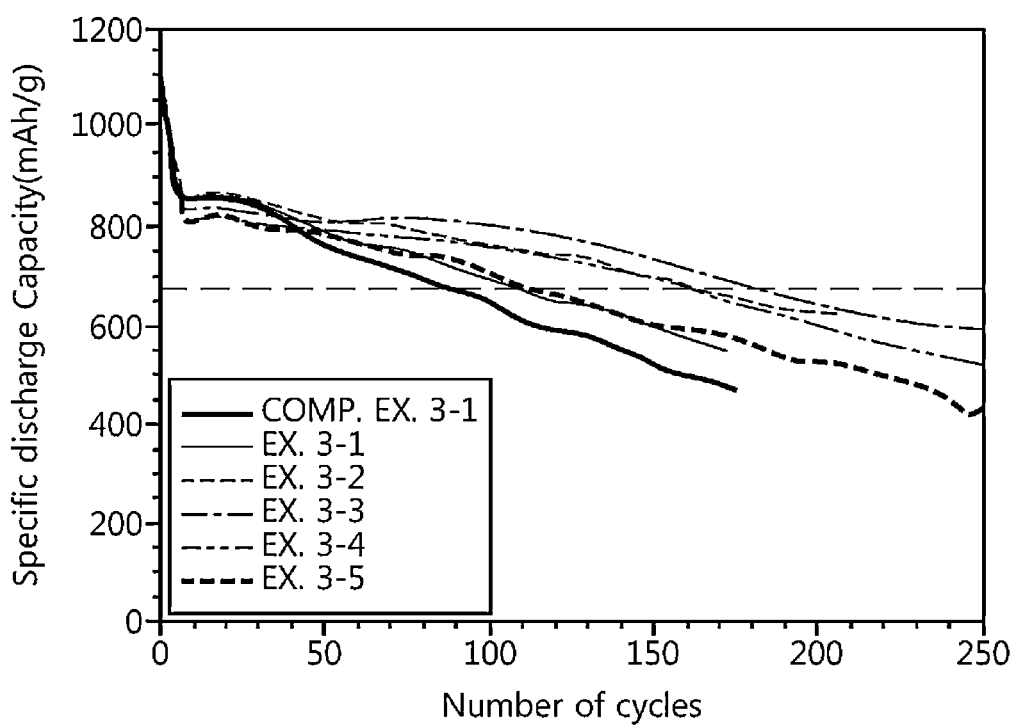
FIG. 9 is a diagram illustrating the cycle life performance of lithium-sulfur batteries manufactured in Examples 3-1 to 3-5 and Comparative Example 3-1.

As can be seen from Table 2 and FIG. 9, it can be seen that the lithium-sulfur batteries manufactured in Examples 3-1 to 3-5 comprising the oxide layer having the cracked region on the surface of the lithium metal show improved cycle life compared to the lithium-sulfur battery obtained in Comparative Example 3-1 without the cracked region in the oxide layer on the surface of the lithium metal. Additionally, it can be seen that the battery life was further improved in the lithium-sulfur batteries manufactured in Examples 3-2 to 3-4 in which the thermal treatment temperature was 60° C. to 100° C. In particular, it can be seen that the lithium-sulfur battery manufactured in Example 3-3 at the thermal treatment temperature between 70° C. and 90° C. has a dramatic increase in life.

What is claimed is:

1. A lithium metal negative electrode, comprising:
   a lithium metal layer; and
   an oxide layer on at least one surface of the lithium metal layer,
   wherein the oxide layer has a cracked region and a non-cracked region,
   wherein the cracked region includes regions of the oxide layer having an opening in a surface of the oxide layer and having a thickness equal to or less than 50% of a maximum thickness of the oxide layer.

2. The lithium metal negative electrode according to claim 1, wherein an area ratio of the cracked region to the non-cracked region is 2:8 to 9:1.

3. The lithium metal negative electrode according to claim 1, wherein the thickness of the oxide layer in the cracked region is 10 nm to 10 μm.

4. The lithium metal negative electrode according to claim 1, wherein a thickness of the lithium metal layer is 1 μm to 200 μm.

5. A method for manufacturing the lithium metal negative electrode of claim 1 comprising the lithium metal layer and the oxide layer on that at least one surface of the lithium metal layer, the method comprising:
   forming the cracked region in the oxide layer.

6. The method for manufacturing the lithium metal negative electrode according to claim 5, wherein the forming the cracked region comprises thermally treating the lithium metal negative electrode in a vacuum atmosphere under a pressure of 0.001 to 1 Torr.

7. The method for manufacturing the lithium metal negative electrode according to claim 5, wherein the forming the cracked region comprises thermally treating the lithium metal negative electrode in an inert atmosphere.

8. The method for manufacturing the lithium metal negative electrode according to claim 5, wherein the forming the cracked region comprises thermally treating the lithium metal negative electrode at 40° C. to 120° C.

9. The method for manufacturing the lithium metal negative electrode according to claim 5, wherein the forming the cracked region comprises thermally treating the lithium metal negative electrode at 65° C. to 85° C.

10. An electrochemical device comprising the lithium metal negative electrode according to claim 1.

11. The electrochemical device according to claim 10, wherein the electrochemical device includes a lithium secondary battery.

12. The electrochemical device according to claim 10, wherein the lithium secondary battery includes at least one of a lithium ion battery, a lithium-sulfur battery, or a lithium-lithium symmetric cell.

13. The lithium metal negative electrode according to claim 1, wherein the cracked region of the oxide layer further includes a region exposing the lithium metal layer.

14. The lithium metal negative electrode according to claim 1, wherein the non-cracked region forms at least one oxide island of non-cracked region surrounded by the cracked region.

15. The lithium metal negative electrode according to claim 1, wherein the oxide layer is a native oxide layer.

16. The lithium metal negative electrode according to claim 1, wherein the oxide layer has a dual layer structure.

17. The lithium metal negative electrode according to claim 16, wherein the dual layer structure comprises an inner layer of lithium oxide ($Li_2O$) and an outer layer having lithium hydroxide (LiOH).

* * * * *